Jan. 17, 1933.　　　　E. J. SVENSON　　　　1,894,719
CAM MILLING ATTACHMENT FOR LATHES AND OTHER MACHINE TOOLS
Filed July 27, 1929　　　4 Sheets-Sheet 1
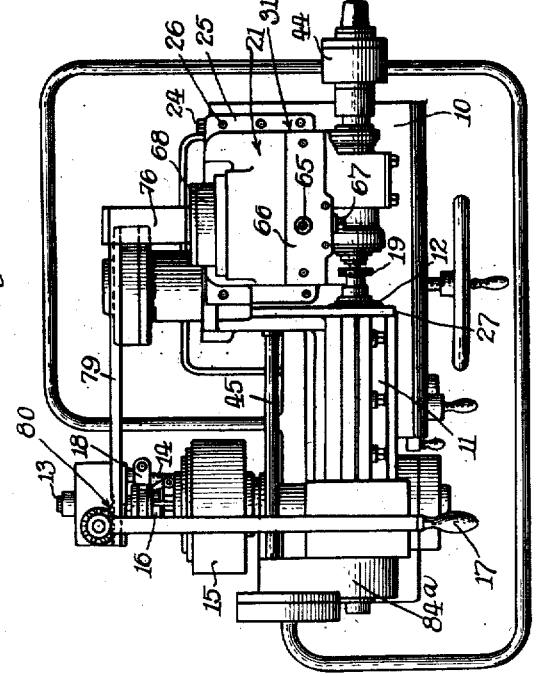
Inventor
Ernest J. Svenson,

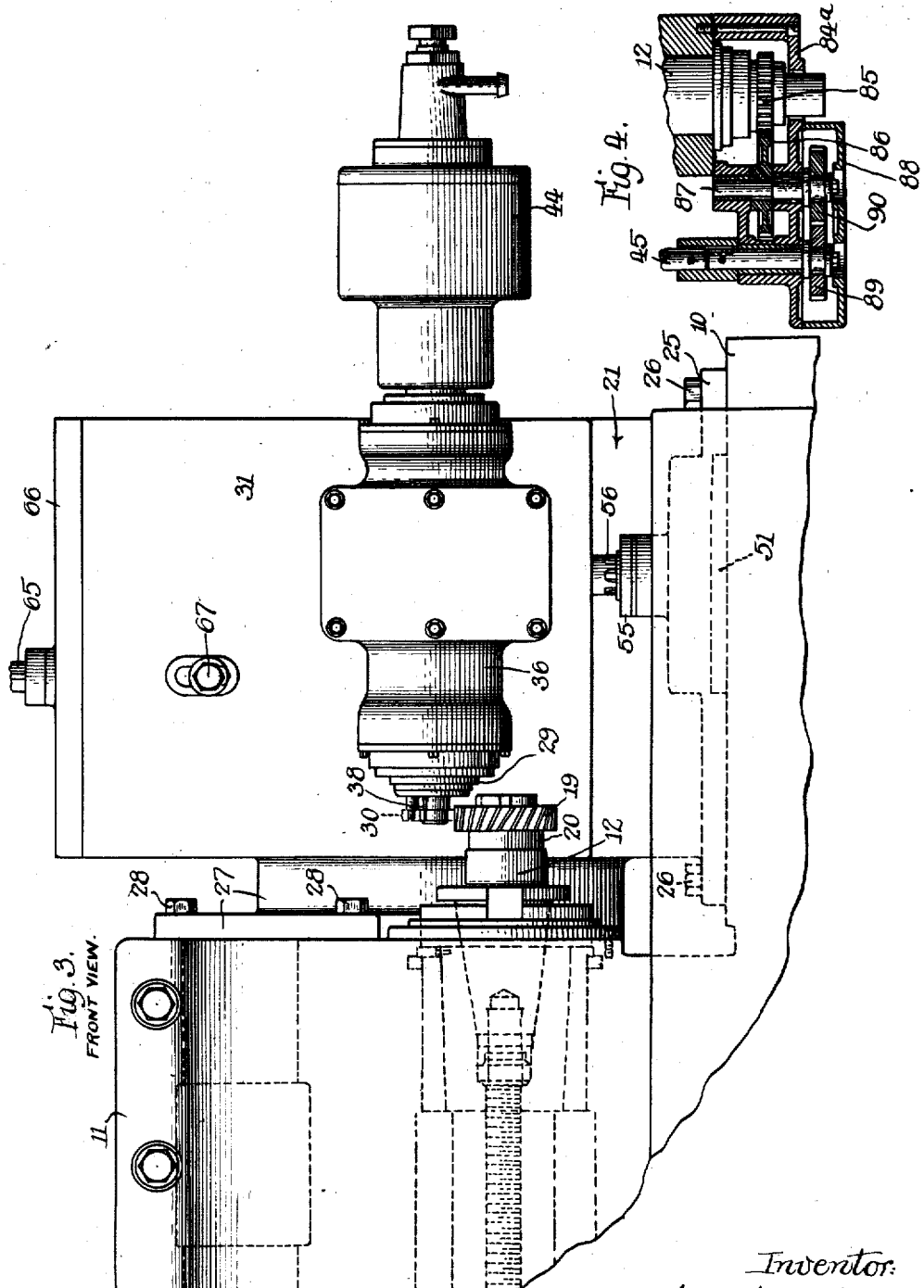

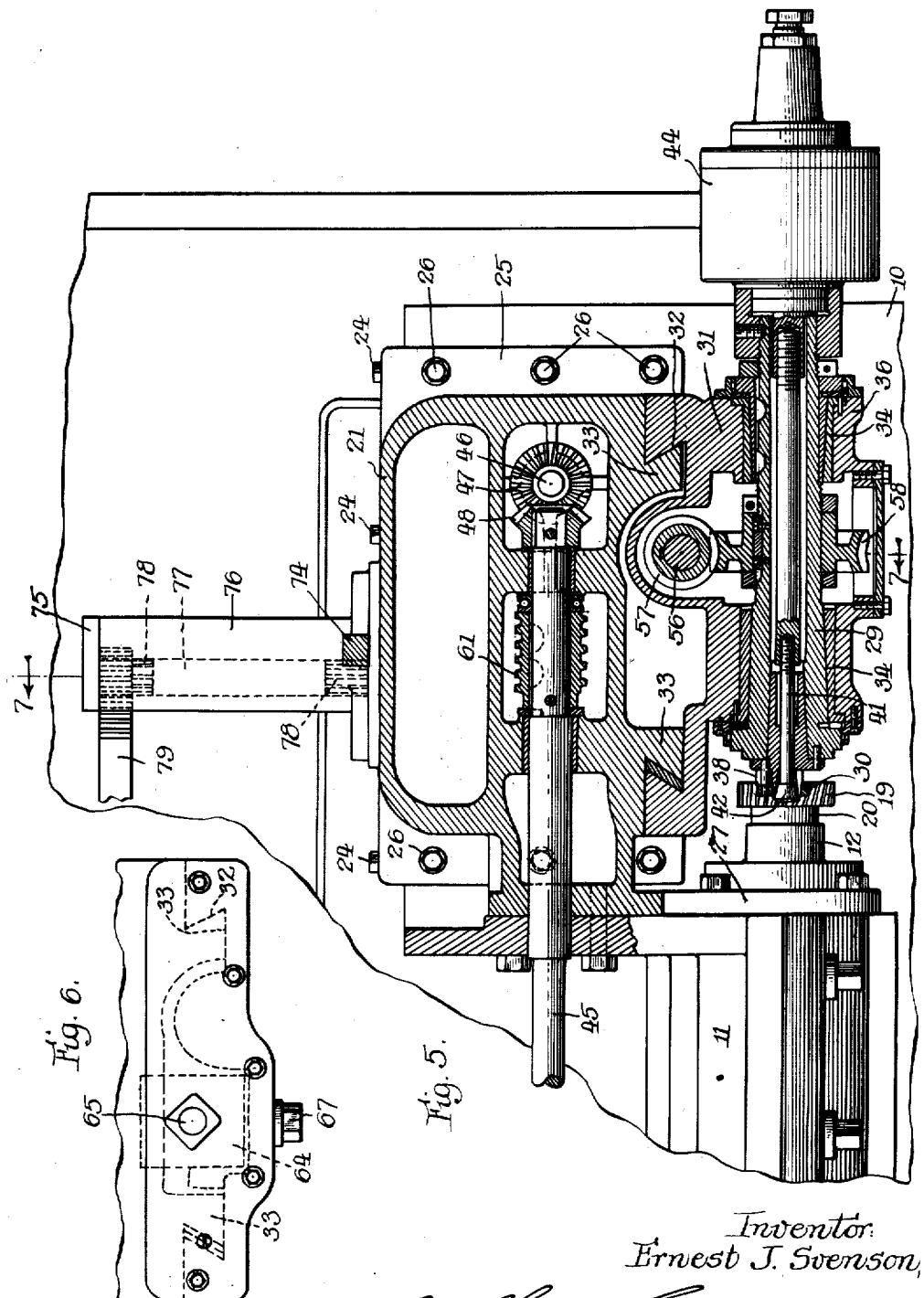

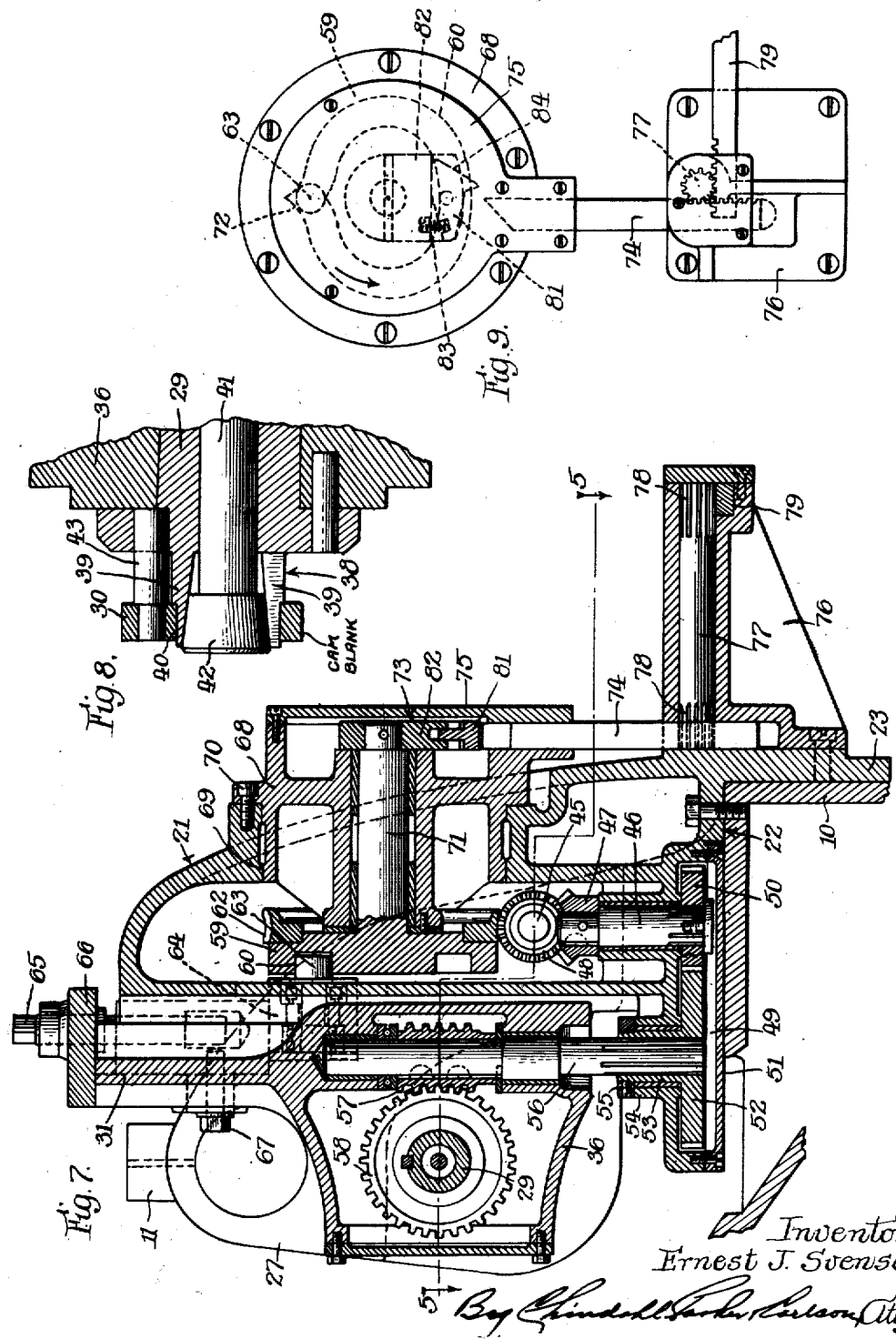

Patented Jan. 17, 1933

1,894,719

UNITED STATES PATENT OFFICE

ERNEST J. SVENSON, OF ROCKFORD, ILLINOIS

CAM MILLING ATTACHMENT FOR LATHES AND OTHER MACHINE TOOLS

Application filed July 27, 1929. Serial No. 381,526.

The invention relates generally to machines for milling cams and has for its primary object the production of a new and improved milling attachment for lathes and other machine tools whereby a standard machine may be adapted for the efficient and rapid production of accurately finished cams.

Cam milling machines ordinarily embody a pair of parallel driven spindles one carrying the work and one carrying a milling cutter in such a position that the cutter and the work may be operatively engaged, together with means for moving one of the spindles toward and away from the other to control the contour of the cam produced.

One of the objects of the invention is to provide a cam milling attachment for lathes adapted to cooperate with a cutter mounted on the headstock spindle of the lathe for the production of cams and embodying a plurality of adjustments which make possible a wide variety of different operating cycles.

Another object is to provide such an attachment adapted to be readily secured on the bed of a standard lathe in rigid relation thereto so as to be driven from the actuating mechanism of the lathe to cooperate with a cutter mounted on the standard headstock spindle of the lathe to produce accurately milled cams.

Another object is to provide such an attachment adapted to be driven from the actuating mechanism of the lathe upon which it is mounted and embodying trip mechanism moving in timed relation to the work supporting means and adapted for connection with the clutch control of the lathe to stop the movement of the various parts upon the completion of the operating cycle.

Another object is to provide a new and improved cam milling attachment for machine tools arranged to produce a vertical type machine.

Another object is to provide such an attachment having a rotatable work support mounted for transverse reciprocation toward and away from the axis of a rotatable cutter and embodying independent, individually adjustable actuating means for rotating said work supporting means and for imparting reciprocatory movement thereto, said means being driven from a common power source.

A further object is to provide a new and improved cam milling machine.

Other objects and advantages will become apparent from the following description taken in connection with the accompanying drawings, in which:

Figure 1 is a front elevational view of a machine embodying the preferred form of the invention.

Fig. 2 is a plan view of the machine shown in Fig. 1.

Fig. 3 is an enlarged fragmental portion of Fig. 1.

Fig. 4 is a sectional view taken substantially along the line 4—4 of Fig. 1.

Fig. 5 is a view taken partially in section along the line 5—5 of Fig. 7.

Fig. 6 is a fragmental plan view of the top of the attachment.

Fig. 7 is a vertical sectional view taken along the line 7—7 of Fig. 5.

Fig. 8 is an enlarged fragmental portion of the chuck shown in Fig. 5.

Fig. 9 is a fragmental rear elevational view of the clutch operating mechanism, the view being taken from the right-hand side of Fig. 7.

While my invention is susceptible of embodiment in many different forms, I have shown in the drawings and will herein describe in detail one such embodiment as incorporated in a lathe, with the understanding that the present disclosure is to be considered as an exemplification of the principles of the invention and is not intended to limit the invention to the embodiment illustrated. The term "lathe" is herein used generally because of the disclosure in the drawings, but it should be understood that the invention is equally applicable to other machine tools.

For the purpose of disclosure, the invention is herein illustrated as embodied in a lathe of the general type shown in Patent No. 1,672,475, issued June 5, 1928 to Gustaf David Sundstrand.

In general the machine comprises a bed 10 having a headstock 11 projecting upwardly from one end thereof and having a horizontally positioned headstock spindle 12 rotatably mounted therein. The head stock spindle 12 is driven by means of a shaft 13 (Fig. 2) extending through the head stock 11 beneath the spindle and projecting rearwardly from the headstock, the outer end of said shaft being rotatably supported by a rearwardly and upwardly extending arm 14 secured on the rear side of the bed 10. A driving connection between the shaft 13 and the headstock spindle 12 may be formed by any preferred means such as a worm and a worm wheel (not shown) fixed within the headstock 11 so that upon rotation of the shaft 13 the headstock spindle will be rotated. A pulley 15 (Fig. 2) rotatably mounted on the shaft 13 between the rear side of the headstock and the rear end of the shaft serves as a power source for rotating the shaft 13. A clutch element 16 keyed on the shaft 16 adjacent the pulley 15 may be shifted longitudinally of the shaft 13 into engagement with a corresponding clutch element on the pulley 15 so as to cause the shaft to rotate with the pulley. A manual operating handle 17 is mounted with its forward end positioned over the headstock adjacent the front of the machine, the rear end of the handle being pivoted in the arm 14 for movement about a vertical axis. Such pivotal movement serves to shift the clutch 16 through a suitable yoke 18 operatively connected to the handle 17 so that movement of the handle to the right (Fig. 2) engages the clutch.

The present embodiment of the invention is formed by mounting an attachment on a lathe of the type disclosed in said Patent No. 1,672,475, in the position usually occupied by the rear carriage of the lathe, the front and rear carriages and the overarm being removed.

In the present machine the headstock spindle 12 carries a milling cutter 19 mounted on a suitable mandrel 20 secured in position on the end of the spindle which ordinarily carries the chuck (not shown) or the headstock center (not shown). To cooperate with the cutter 19 thus mounted for the production of accurately milled cams an attachment is provided adapted for mounting on the bed of the lathe and embodying the rotatable work supporting means automatically movable toward and away from the axis of the cutter to produce the desired peripheral contour on a cam blank supported and rotated by said means.

In this embodiment of the invention, the attachment comprises a stationary support or frame in the form of a column 21 adapted to be removably secured on the bed 10 in the position normally occupied by the rear tool slide, the column having a flat bottom surface 22 (Fig. 7) adapted to rest on the bed and prevent rocking or lateral movement of the column. For the purpose of securing the column to the bed, a downwardly extending flange 23 is provided along the rear side of the column 21 adapted to receive a plurality of cap screws 24 which project therethrough and engage the bed 10. A horizontal flange 25 is also provided on each side of the column through each of which a plurality of cap screws 26 may extend downwardly into engagement with the bed. As an additional safeguard against movement of the column relatively to the bed, a bracket 27 is formed integrally with the column 21 so as to extend forwardly from one side thereof (left side as shown herein) this bracket being adapted to abut the end of the headstock 11 above the headstock spindle 12 so that the bracket may be attached securely to the headstock by means of a plurality of cap screws 28.

The work supporting means herein shown is in the form of a tubular spindle 29 rotatably mounted so as to be parallel to the headstock spindle 12 and in the same vertical plane so that a cam blank secured on one end of the work spindle 29 may be moved into operative engagement with the cutter 19 by downward movement of the work spindle 29. With this arrangement of the work supporting means the chips cut from a cam blank 30 fall away from the work so as to prevent scratching of the surface of the work or dulling of the cutter and in addition, the work is always in a position where it may be readily observed by the operator. To permit of vertical movement of the work, the work spindle 29 is rotatably mounted in a head 31 which is slidably mounted on the forward face of the column 21 and is guided for vertical movement along the column by a pair of dovetail ways 32 (Figs. 5 and 6) formed on the head and engaging a pair of complemental guides 33 on the forward face of the column. Radial and axial support for the work spindle 29 is provided by a pair of tapered bearings 34 (Fig. 5) positioned in the ends of a horizontal housing 36 which projects forwardly from the head 31 and surrounds the spindle 29 intermediate its ends.

On the end which lies above the cutter 19, the work spindle 29 carries a chuck 38 (Fig. 8) by means of which the cam blank may be secured on the spindle for rotation therewith.

The chuck 38 in the present form comprises an annular series of fingers 39 attached to the work spindle 29 concentrically therewith and adapted to project into a central bore 40 formed in the cam blank 30. The fingers 39 abut the side wall of the bore 40 at annularly spaced points so as to accurately center the cam 30, and to firmly fix the cam in position the fingers 39 are bent radially outwardly by longitudinal movement of a rod 41 having a tapered surface 42 engaging the inner sides of the fingers 39. To provide a positive drive for the cam blank 30 a pin 43 on the chuck 38 is arranged to project into a hole formed in the cam blank eccentrically of its axis. The chuck 38 may be operated to secure a work piece on the work spindle 29 by means of a double-acting piston and cylinder device 44 (Fig. 5) mounted on the other end of the spindle 29 and operatively connected to the chuck by means of the rod 41 extending through the spindle. Suitable air supply and control means of a well known character may be provided for the piston and cylinder device 44.

By moving the head 31 toward and away from the axis of the rotating cutter 19 during rotation of the spindle 29, a cam of the desired peripheral contour may be produced. In order that an unusually large number of different operating conditions may be readily met, the rotative movement of the work spindle 29 and the vertical movement of the head 31 are preferably secured by independent and separately adjustable actuating means driven from a common power source which may be readily connected to the standard actuating mechanism of the lathe upon which the attachment is mounted. The common power source in the present instance comprises a horizontally positioned rotatable shaft 45 (Figs. 2, 4, 5 and 7) extending along the rear side of the headstock 11 in an out-of-the-way position and journaled at one end in the column 21.

The driving connection between the shaft 45 and the work spindle 29 through which the work spindle is rotated is best shown in Figs. 5 and 7 and comprises a stub shaft 46 rotatably mounted in vertical position within the column 21, the upper end of the stub shaft 46 having a beveled gear 47 thereon engaging a similar beveled gear 48 fixed on the end of the drive shaft 45. The lower end of the stub shaft 46 extends into a chamber 49 (Fig. 7) formed at the bottom of the column, the end of the shaft 46 being splined to receive a pick-off gear 50. The lower wall of the chamber 49 is formed by a plate 51 removably secured to the bottom of the column and forming a part of the flat bottom surface 22 of the bottom of the column. The chamber 49 extends forwardly beyond the front wall of the column 21 so that it lies beneath the head 31 and a second pick-off gear 52 meshing with the gear 50 is mounted in the forward portion of the chamber 49 by means of a sleeve 53 formed integrally with the gear 52 and projecting upwardly through a boss 54 formed on the top wall of the chamber. A collar 55 positioned on the outside of the chamber 49 engages the top of the boss 54 and the end of the sleeve 53 to maintain the gear in the proper vertical position.

The gear 52 has a splined connection with a vertical shaft 56 rotatably mounted in fixed longitudinal position in the head 31 so as to move up and down therewith, a worm 57 being secured on the shaft 56 within the head 31 and in engagement with a worm wheel 58 keyed on the work spindle 29. Thus the spindle 29 may be rotated in any vertical position of the head or during vertical movement of the head; and the rate of rotation may be readily altered by replacement of the gears 50 and 52 with gears of other ratios to effect one or more complete revolutions of the work spindle in each vertical reciprocation of the head 31.

The driving connection between the shaft 45 and the head 31 for vertically reciprocating the same comprises a master cam 59 (Fig. 7) of the face type having a groove 60 therein, said cam being mounted within the column for rotation about a horizontal axis. The cam 59 is driven from the shaft 45 by a worm 61 (Fig. 5) keyed on the drive shaft 45 within the column and engaging a worm wheel 62 fixed on the cam 59. The master cam 59 is positioned parallel and adjacent to the rear surface of the head 31 so that its groove 60 may be engaged by a roller 63 carried by the head. Upon rotation of the cam 59 the head is moved up and down in accordance with the form of the master groove 60 to produce the desired contour on a cam blank.

In order that the size of the cam to be produced by the use of a given master cam may be easily determined, the roller 63 is adjustably mounted on the head 31, this being accomplished by mounting the roller on a block 64 which is adjustable vertically in the head by means of an adjusting screw 65. The adjusting screw 65 is rotatably mounted in fixed vertical position in a flange 66 which projects rearwardly from the upper edge of the head; the lower end of the screw engages the block 64, while the upper end is squared and projects upwardly from the flange 66. A clamping bolt 67 extending through a vertically elongated slot in the head 31 and engaging the block 64 may be tightened to secure the roller firmly in its adjusted position.

The mounting of the master cam 59 within the column 21 is preferably of such character that the cam may be readily removed for inspection or substitution of a different form of master cam. In the present instance, this mounting comprises a removable bearing member 68 (Fig. 7) projecting through and fitting snugly in an aperture 69 in the rear wall of the column 21 and removably secured in position by bolts 70. In the bearing member 68 a shaft 71 is rotatably mounted and the master cam 59 is carried on the forward end of this shaft.

The cam groove 60 is preferably arranged to impart a rapid advancing movement to the head 31 immediately upon initiation of the movement of the various parts, and to rapidly retract or raise the head after the milling of the periphery of the cam blank has been completed and for this purpose the cam groove 60 has an outwardly extending lobe 72 formed therein as shown in Fig. 9.

The machine is preferably provided with trip mechanism to automatically stop the movement of the various parts upon the completion of a cam. In the use of the machine the driving mechanism is usually arranged so the milling of a cam is completed in one revolution of the work spindle and the master cam and with such an arrangement the trip mechanism may be associated with the master cam so as to be actuated at the end of each revolution thereof. The trip mechanism in the present embodiment is carried principally upon the column 21 and is best illustrated in Figs. 2, 5, 7 and 9. During the operation of the machine the master cam 59 rotates in a counter-clockwise direction as shown in Fig. 9 and a cam device 73 is mounted on the rear end of the cam shaft 71 so as to rotate therewith and during such rotation it is arranged to engage a vertically reciprocatory rod 74. The rod 74 has its upper end slidably mounted in the bearing member 68 and is held in position by a plate 75 which also serves to close the rear side of the bearing member.

The lower end of the rod 74 is slidable in a bracket 76 which is secured near the bottom of the rear wall of the column 21 and projects rearwardly therefrom. A shaft 77 rotatably mounted in horizontal position and extending rearwardly in the bracket 75 has a pinion 78 formed at each end thereof, the pinion at the forward end being engaged by a rack formed on the vertical rod 74 while the other pinion 78 is engaged by a rack formed on one end of a horizontally movable bar 79. One end of the bar 79 is supported and guided for longitudinal sliding movement by the bracket 76 while the other end of the bar is slidably supported by the arm 14 adjacent the clutch shifting mechanism. The bar 79 is operatively connected to the clutch shifting handle 17 by means of a rack 80 (Fig. 2) and pinion (not shown) so that upon movement of the bar to the left as shown in Figs. 2 and 5, the handle 17 will be moved back to the position shown in Fig. 2 and the clutch 16 will be disengaged.

The cam device 73 for actuating the vertically slidable rod 74 is preferably in the nature of a "load and fire" device and comprises a member 81 pivoted eccentrically of the axis of the cam shaft 71 on an arm 82 for limited movement about an axis which is parallel to the cam shaft. The member 81 is normally pressed to the position shown in Fig. 9 by means of a spring 83 and upon engagement of a leading cam surface 84 formed on the member 81 with the upper end of the rod 74, the member 81 is pivoted in a clockwise direction to compress the spring. After the spring has been compressed, further movement of the cam shaft 71 causes the cam surface 84 to move the rod positively downwardly until the clutch 16 has been disengaged, whereupon the spring 83 expands to throw the abrupt trailing end of the cam out of the path of movement of the rod. Thus the rod 74 may be moved upwardly when the clutch 16 is manually engaged to initiate movement of the parts to form another cam.

As above pointed out, the drive shaft 45 is adapted to be readily connected to the standard actuating mechanism of the lathe and in the present case is operatively connected to the rear end of the headstock spindle 12. This connection is formed through a gear box 84ª (Figs. 1, 2 and 4) secured on the end of the head stock 11 in surrounding relation to the end of the headstock spindle 12 and projecting rearwardly beyond the rear wall of the headstock so that the end of the drive shaft 45 may project into the gear box 84ª and be rotatably supported thereby. Within the gear box 84ª a gear 85 is fixed on the headstock spindle 12 and engages a gear 86 fixed on a stub shaft 87 rotatably mounted within the gear box. The stub shaft 87 and the drive shaft 45 are parallel and their ends project into a chamber formed by a housing 88 removably secured in position on the gear box 84. Within the housing 88 a pair of pick-off gears 89 and 90 are removably fixed on the ends of the drive shaft 45 and the stub shaft 87 respectively so as to complete the driving connection between the headstock spindle 12 and the drive shaft. Thus the entire actuating mechanism of the machine is under the control of the main clutch 16.

In the operation of the machine a cam blank is secured on the work spindle by operation of the air actuated chuck while the head is in its upper or retracted position. The main clutch is then engaged by means of the manual control handle so as to initiate rotation of the two spindles and the master cam. The master cam then causes the cam blank mounted on the work spindle to be advanced rapidly into operative relation with the cutter and controls its relation to the cutter as the operation progresses so as to produce the desired form of cam. At the end of the milling operation the head is raised to separate the finished cam from the cutter and the rotative movement of all of the parts is stopped through the medium of the trip device which disengages the main clutch. After the finished cam has been unclamped and removed from the chuck, another blank may be placed in the machine and the operation repeated.

The attachment thus provided is exceedingly simple in character since it comprises but two units, namely, the column and the gear box, in addition to the cutter mounting mandrel 20, and these two units embody adjustable actuating connections which render the resulting machine capable of producing a wide range of work.

It will also be seen that by reason of the extremely rigid mounting provided for the column by means of the flat base and the bracket secured to the headstock, the attachment is of such a character that the work produced will be unusually accurate.

The accuracy of the work is also increased by the mounting of the master cam on a different axis than the work spindle since this makes it possible to apply the actuating force to the movable head at such a point that it will not tend to twist the head on its guiding ways. This construction permits the head to be more tightly adjusted on the guiding ways and results in more accurately determining the movement of the cam blank toward and away from the cutter.

The mounting of the master cam and the work spindle in such a manner that an independently adjustable driving connection may be provided for rotating the work spindle serves to make the machine capable of producing many different classes of work. Thus by changing the rotative relation of the master cam and the work spindle the same master cam may be used to produce a single lobe cam or a multiple lobe cam, each lobe of which has the same radial projection as the single lobe cam. Obviously, the driving mechanism may be altered in other respects to provide many other desirable operating cycles.

By adapting the attachment for operative connection with the usual actuating mechanism of the lathe and providing a clutch shifting mechanism adapted to operate the main clutch of the lathe, the attachment is simplified and provides an advantageous operating cycle which is terminated at an accurately determined point so as to facilitate reloading of the work spindle.

Furthermore, it will be noted that the invention provides a cam milling machine of the vertical type so that the work may be observed by the operator at any time. Since the work is positioned above the cutter, the chips fall away from the work and the cutter, thus making the work more easily visible and avoiding damage to the work or the cutter due to the presence of the chips.

I claim as my invention:—

1. The combination with a machine tool having a bed, a headstock at one end of said bed having a headstock spindle therein, and clutch controlled actuating means for said headstock spindle, of a cutter on said spindle and a cam milling attachment comprising a column secured on said bed rearwardly of the plane of said headstock spindle, a head mounted for vertical reciprocation on the forward side of said column, rotatable work supporting means on said head adapted to support and rotate a cam blank above said cutter, a master cam rotatably mounted on said column, a roller engaging said master cam and having an adjustable connection with said head whereby to control the vertical position thereof, a drive shaft operatively connected to said master cam to rotate the same and journalled in said column and extending along the rear side of said headstock, said shaft being operatively connected to the far end of said headstock spindle so as to be driven thereby, a driving connection between said shaft and said work supporting means including a pair of change gears, and a movable trip device driven from said shaft and operable to disengage the clutch of said actuating means upon completion of a cam.

2. The combination with a machine tool having a bed, a headstock at one end of said bed having a headstock spindle therein, and clutch controlled actuating means for said headstock spindle, of a cutter on said spindle and a cam milling attachment comprising a column secured on said bed adjacent to said headstock spindle, a head mounted for vertical reciprocation on said column, rotatable work supporting means on said head adapted to support and rotate a cam blank substantially in the vertical plane of said cutter, a rotatable master cam removably mounted on said column so as to permit removal of said cam for inspection or replacement, a roller engaging said master cam and having an adjustable connection with said head whereby to control the vertical position thereof, a drive shaft operatively connected to said master cam to rotate the same and journalled in said column and operatively connected to the far end of said headstock spindle so as to be driven thereby, a driving connection between said shaft and said work supporting means including a pair of change gears, and a movable trip device mounted on said column and driven from said shaft and operable to disengage the clutch of said actuating means upon completion of a cam.

3. The combination with a machine tool having a bed, a headstock at one end of said bed having a headstock spindle therein, and clutch controlled actuating means for said headstock spindle, of a cutter on said spindle and a cam milling attachment comprising a column secured on said bed adjacent to said headstock spindle, a head mounted for vertical reciprocation on said column, rotatable work supporting means on said head adapted to support and rotate a cam blank substantially in the vertical plane of said cutter, a rotatable master cam removably mounted on said column so as to permit removal of said cam for inspection or replacement, a roller engaging said master cam and having an adjustable connection with said head whereby to control the vertical position thereof, a drive shaft operatively connected to said master cam to rotate the same and journalled in said column and operatively connected to the actuating mechanism of the machine, a driving connection between said shaft and said work supporting means operable to rotate said means, and trip mechanism operable to disengage the clutch of said actuating means upon completion of a cam milling operation.

4. The combination with a machine tool having a bed, a headstock at one end of said bed having a headstock spindle therein, and clutch controlled actuating means for said headstock spindle, of a cutter on said spindle and a cam milling attachment comprising a column forming a stationary support secured on said bed adjacent to said headstock spindle, a head mounted for vertical reciprocation on said column and constituting a movable support, rotatable work supporting means on said head adapted to support and rotate a cam blank in substantially the vertical plane of said cutter, a master cam rotatably mounted on one of said supports, a roller engaging said master cam and having an adjustable connection with the other one of said supports whereby to control the size of the cam produced by the machine, a drive shaft operatively connected to said master cam to rotate the same and journalled in said column and operatively connected to said actuating means so as to be driven thereby, a driving connection between said shaft and said work supporting means for rotating the same, said connection including a pair of change gears, and a movable trip device driven from said shaft and operable to disengage the clutch of said actuating means upon completion of a cam.

5. The combination with a machine tool having a bed, a headstock at one end of said bed having a headstock spindle therein, and actuating means for said headstock spindle, of a cutter on said spindle and a cam milling attachment comprising a column forming a stationary support secured on said bed adjacent to said headstock spindle, a head mounted for vertical reciprocation on said column and constituting a movable support, rotatable work supporting means on said head adapted to support and rotate a cam blank in substantially the vertical plane of said cutter, a master cam rotatably mounted on one of said supports, a roller engaging said master cam and having an adjustable connection with the other one of said supports whereby to control the size of the cam produced by the machine, a drive shaft operatively connected to said master cam to rotate the same and journalled in said column and operatively connected to the actuating means so as to be driven thereby, and an independent driving connection between said shaft and said work supporting means for rotating the same.

6. The combination with a machine tool having a bed, a headstock at one end of said bed having a headstock spindle therein, and actuating means for said headstock spindle, of a cutter on said spindle and a cam milling attachment comprising a column forming a stationary support secured on said bed adjacent to said headstock spindle, a head mounted for vertical reciprocation on said column and constituting a movable support, rotatable work supporting means on said head adapted to support and rotate a cam blank in substantially the vertical plane of said cutter, a rotatable master cam, means removably supporting said master cam on one of said supports, a cam follower engaging said master cam and having an adjustable connection with the other one of said supports whereby to permit of varying the size of cam to be produced, a drive shaft mounted in said column and operatively connected to said master cam to rotate the same, means including a pair of alterable change gears operatively connecting said shaft and said actuating means, and a driving connection between said shaft and said work supporting means for rotating the same, said connection including a pair of change gears.

7. The combination with a machine tool having a bed, a headstock at one end of said bed having a headstock spindle therein, and actuating means for said headstock spindle, of a cutter on said spindle and a cam milling attachment comprising a column forming a stationary support secured on said bed adjacent to said headstock spindle, a head mounted for vertical reciprocation on said column and constituting a movable support, rotatable work supporting means on said head adapted to support and rotate a cam blank in substantially the vertical plane of said cutter, a rotatable master cam mounted on one of said supports, a cam follower engaging said master cam and having an adjustable connection with the other one of said supports whereby to permit of varying the size of cam to be produced, a drive shaft mounted in said column and operatively connected to said master cam to rotate the same, means including a pair of alterable change gears operatively connecting said shaft and said actuating means, and an independent driving connection between said shaft and said work supporting means for rotating the same, said connection including a pair of change gears.

8. The combination with a machine tool having a bed, a headstock at one end of said bed having a headstock spindle therein, and actuating mechanism for said headstock spindle, of a cutter on said spindle and a cam milling attachment comprising a column forming a stationary support secured on said bed adjacent to said headstock spindle, a head mounted for vertical reciprocation on said column and constituting a movable support, rotatable work supporting means on said head adapted to support and rotate a cam blank in substantially the vertical plane of said cutter, a rotatable drive shaft mounted in said column and operatively connected to said actuating mechanism, means driven from said shaft operable to control the vertical position of said head, and an independent adjustable driving connection between said shaft and said work supporting means for rotating the same.

9. The combination with a machine tool having a bed, a headstock at one end of said bed having a headstock spindle therein, and actuating mechanism for said headstock spindle, of a cutter on said spindle and a cam milling attachment comprising a column forming a stationary support removably secured on said bed adjacent to said headstock spindle, a head mounted for vertical reciprocation on said column and constituting a movable support, rotatable work supporting means on said head adapted to support and rotate a cam blank in substantially the vertical plane of said cutter, a rotatable drive shaft mounted in said column and operatively connected to the actuating mechanism, means movably mounted on one of said supports and driven from said shaft operable to control the vertical position of said head, and a driving connection between said shaft and said work supporting means for rotating the same in any vertical position of the head.

10. A cam milling attachment for lathes and other machine tools, said attachment comprising a column adapted to be removably secured on the bed of a lathe adjacent to the headstock spindle, a head mounted for vertical reciprocation on said column, rotatable work supporting means on said head adapted to support and rotate a cam blank substantially in the vertical plane of a cutter mounted on the headstock spindle of the lathe, a rotatable master cam removably mounted on said column so as to permit removal of said cam for inspection or replacement, a roller engaging said master cam and having an adjustable connection with said head whereby to control the vertical position thereof, a drive shaft operatively connected to said master cam to rotate the same and journalled in said column, said shaft being adapted to extend along the rear side of the lathe headstock and being adapted to be operatively connected to the actuating mechanism of the lathe so as to be driven thereby, a driving connection between said shaft and said work supporting means including a pair of change gears, and a movable trip device mounted on said column and driven from said shaft and adapted for connection with a clutch of the lathe actuating means so as to disengage the clutch of said actuating means upon completion of a cam.

11. A cam milling attachment for lathes and other machine tools comprising, in combination, a column adapted to be secured on the bed of a lathe adjacent to the headstock spindle, a head mounted for vertical reciprocation on said column, rotatable work supporting means on said head adapted to support and rotate a cam blank substantially in the vertical plane of a cutter fixed on the headstock spindle of the lathe, a rotatable master cam mounted on said column so as to permit removal of said cam for inspection or replacement, a roller engaging said master cam and having an adjustable connection with said head whereby to control the vertical position thereof, a drive shaft operatively connected to said master cam to rotate the same and journalled in said column and adapted to be operatively connected to the actuating mechanism of the lathe upon which the attachment is mounted, and an independent driving connection between said shaft and said work supporting means operable to rotate said work supporting means.

12. A cam milling attachment for lathes and other machine tools comprising, in combination, a stationary support adapted to be secured on the bed of a lathe adjacent to the headstock spindle, a movable support mounted on said stationary support for reciprocation transversely of said spindle, rotatable work supporting means on said movable support adapted to support and rotate a cam blank in operative relation to a cutter fixed on the headstock spindle of the lathe, a rotatable master cam removably mounted on said stationary support so as to permit removal of said cam for inspection or replacement, a roller engaging said master cam and having an adjustable connection with said movable support whereby to control the position of the work supporting means relatively to the cutter, a drive shaft operatively connected to said master cam to rotate the same and journalled in said fixed support and adapted to be operatively connected to the actuating mechanism of the lathe upon which the attachment is mounted, and an independent driving connection between said shaft and said work supporting means operable to rotate said means.

13. A cam milling attachment for lathes and other machine tools comprising, in combination, a stationary support adapted to be secured on the bed of a lathe adjacent to the headstock spindle, a movable support mounted on said stationary support for reciprocation transversely of said spindle, rotatable work supporting means on said movable support adapted to support and rotate a cam blank in operative relation to a cutter fixed on the headstock spindle of the lathe, a rotatable master cam removably mounted on said stationary support so as to permit removal of said cam for inspection or replacement, a roller engaging said master cam and connected to said movable support whereby to control the position of the work relatively to the cutter, a drive shaft operatively connected to said master cam to rotate the same and journalled in said fixed support and adapted to be operatively connected to the actuating mechanism of the lathe upon which the attachment is mounted, and an independent adjustable driving connection between said shaft and said work supporting means operable to rotate said means in timed relation to said master cam.

14. A cam milling attachment for lathes and other machine tools, said attachment comprising a fixed support adapted to be removably secured on the bed of a lathe adjacent to the headstock spindle, a movable support mounted on said fixed support for reciprocation transversely of the axis of said spindle, rotatable work supporting means on said movable support adapted to support and rotate a cam blank in operative relation to a cutter mounted on the headstock spindle of the lathe, a rotatable master cam mounted in said fixed support so as to permit removal of said cam for inspection or replacement, a roller engaging said master cam and having an adjustable connection with said movable support whereby to control the position thereof relatively to the cutter on the lathe spindle, a drive shaft operatively connected to said master cam to rotate the same and journalled in said fixed support, and a driving connection between said cam and said work supporting means including a pair of change gears.

15. A cam milling attachment comprising, in combination, a column, a head mounted on the forward face of said column for vertical reciprocation thereon, a work supporting spindle rotatably mounted in horizontal position in said head and having work clamping means on one end thereof, said column having a flat bottom surface adapted to rest upon the bed of a lathe or other machine tool, a drive shaft extending into and rotatably mounted in said column, a master cam mounted in said column for rotation about a horizontal axis, means connecting said drive shaft and said master cam operable to rotate said cam upon rotation of said drive shaft, a follower on said head engaging said cam, said column being formed to provide a chamber at the bottom thereof, said chamber extending forwardly from said column beneath said head, a removable plate forming the bottom wall of said chamber and constituting a continuation of said flat surface, a shaft mounted vertically in said column and extending into said chamber, said shaft being driven from said drive shaft, a splined shaft vertically mounted and extending into said head and having a driving connection with said spindle, and a pair of change gears on said chamber, one engaging said splined shaft and the other being mounted on the other vertical shaft.

16. A cam milling attachment for lathes and other machine tools comprising, in combination, a column having a flat bottom surface adapted to rest upon the bed of a lathe, a head mounted for vertical reciprocation on the forward face of said column, work supporting means in said head mounted for rotation about a horizontal axis, a drive shaft extending to said column, means driven by said drive shaft operable to control the vertical position of said head upon said column, a chamber in said column at the bottom thereof, and means for rotating said work supporting means in any vertical position of said head, said rotating means including a pair of alterable change gears mounted in said chamber.

17. A cam milling attachment for lathes and other machine tools comprising, in combination, a column adapted to be secured on the bed of a lathe adjacent to the headstock spindle thereof, a head mounted for vertical reciprocation on said column, work supporting means mounted on said head for movement therewith and for rotation about a horizontal axis above the spindle axis for supporting work pieces for operation by a cutter on the lathe spindle, a master cam mounted in said column for rotation about a fixed horizontal axis, a follower on said head engaging said cam, and means for rotating said master cam and said work supporting means in timed relation to each other.

18. A cam milling attachment for lathes and other machine tools having a cutter mounted on a horizontal headstock spindle comprising, in combination, a frame adapted to be removably secured on the bed of a lathe adjacent to the headstock spindle thereof, work supporting means mounted on said frame for rotation about a horizontal axis above the spindle axis and for reciprocation transversely of said axis, a master cam mounted on said frame for rotation about a fixed axis and connected to said work supporting means to reciprocate the same, and means for rotating said master cam and said work supporting means in timed relation.

19. A cam milling attachment for lathes and other machine tools comprising, in combination, a frame adapted to be mounted on a lathe bed adjacent to the headstock spindle thereof, rotatable work supporting means, a support carrying said means and mounted on said frame for bodily movement relatively to said frame so as to vary the relation of said means to a cutter mounted on the headstock spindle of the lathe, means for imparting such movement to said support, and a trip mechanism carried by said frame and adapted to disengage the clutch of the lathe upon completion of a cam, and means for actuating both of said means and said mechanism, said mechanism embodying a trip element arranged to move at a substantially greater rate of speed than said support.

20. A cam milling attachment for lathes and other machine tools comprising, in combination, a first unit comprising a column adapted to be secured in fixed position on a lathe bed, a head vertically slidable on said column, work supporting means mounted in said head for rotation about a horizontal axis, a shaft having one end rotatably mounted in said column, means including a pair of change gears driven from said shaft for rotating said work supporting means, and means driven from said shaft to vary the vertical position of said head during rotation of said work supporting means, and a second unit comprising a gear box adapted to be secured to the lathe bed and to support the other end of said shaft, and means including a pair of change gears carried by said gear box adapted to form an operative driving connection between the actuating mechanism of a lathe and said shaft.

21. A cam milling attachment for lathes and other machine tools comprising, in combination, a first unit comprising a column adapted to be secured in fixed position on a lathe bed, a head vertically slidable on said column, work supporting means mounted in said head for rotation about a horizontal axis, a shaft having one end rotatably mounted in said column, means including a pair of change gears driven from said shaft for rotating said work supporting means, means driven from said shaft to vary the vertical position of said head during rotation of said work supporting means, and a clutch shifting mechanism for stopping the operation of said attachment, said mechanism being carried by said column and driven from said shaft, and a second unit comprising a gear box adapted to be secured to the lathe bed and to support the other end of said shaft, and means including a pair of change gears carried by said gear box adapted to form an operative driving connection between the actuating mechanism of a lathe and said shaft.

22. A cam milling attachment for lathes and other machine tools comprising, in combination, a first unit comprising a frame adapted to be secured in fixed position on a lathe bed, a head slidable on said frame, work supporting means mounted in said head for rotation about an axis perpendicular to the path of movement of said head, a shaft having one end rotatably mounted in said frame, means including a pair of change gears driven from said shaft for rotating said work supporting means, and means driven from said shaft to vary the position of said head during rotation of said work supporting means, and a second unit comprising a gear box adapted to be secured to the lathe bed and to support the other end of said shaft, and means including a pair of change gears carried by said gear box adapted to form an operative driving connection between the actuating mechanism of a lathe and said shaft.

23. A cam milling attachment for lathes and other machine tools, said attachment comprising, in combination, a column having its lower end adapted for securement to the bed of a lathe, a bracket on said column near its upper end adapted to be secured to the headstock of a lathe, rotatable work supporting means mounted on said column for rotation about a horizontal axis and for vertical movement on said column, a drive shaft mounted on said column and adapted for connection with the actuating mechanism of a lathe, and independent means driven from said shaft for rotating said work supporting means and for controlling the vertical position of said supporting means on said column.

24. A cam milling attachment for a lathe and other machine tools, said attachment comprising, in combination, a column adapted at its lower end to be secured to the bed of a lathe, a bracket projecting laterally from the upper end of said column and adapted to be secured to the headstock of the lathe, a head vertically slidable on said column, work supporting means mounted in said head for rotation about a horizontal axis, and means mounted on said column for rotating said work supporting means and for controlling the vertical position of said head, said means being adapted for connection with the actuating mechanism of the lathe.

25. A cam milling machine comprising, in combination, a bed, a column uprising from said bed, a head vertically movable on said column, a rotatable spindle mounted in horizontal position on said head, a second spindle rotatably mounted in horizontal position on said bed in the same vertical plane with said first spindle, one of said spindles having a cutter mounted thereon so as to lie beneath one end of the other spindle, means on the other spindle for supporting and rotating a cam blank above said cutter, means for rotating both of said spindles, and means for varying the vertical position of said head to control the peripheral contour of the cams produced by the machine.

26. A cam milling attachment for lathes and other machine tools, comprising, in combination, a support adapted to be mounted in fixed position on a lathe bed, rotatable work supporting means, a head carrying said means and mounted on said support for movement transversely of the axis of rotation of said means, a master cam removably mounted on said support and movable to actuate said head, said cam having an adjustable connection with said head, means for actuating said cam and including a pair of change gears adapted for connection with the actuating mechanism of the lathe, and a driving connection between said last mentioned means and said work supporting means including a pair of alterable change gears.

27. A cam milling attachment for lathes and other machine tools, comprising, in combination, a frame adapted to be mounted in fixed position on a lathe bed, a head reciprocably mounted on said frame, rotatable work supporting means on said head, a rotatable master cam removably mounted on said frame and connected to said head whereby to move the same, means for rotating said master cam adapted to be operatively connected to the actuating mechanism of the lathe and including a pair of change gears, and a driving connection between said last mentioned means and said work supporting means including a pair of alterable change gears.

28. A cam milling machine comprising, in combination, a bed, a support uprising from said bed, a member vertically movable on said support, a rotatable spindle mounted horizontally on said member, a second spindle rotatably mounted in a horizontal position on said bed, one of said spindles having a cutter mounted thereon so as to lie beneath one end of the other spindle, means on the other spindle for supporting a cam blank above said cutter, a master cam rotatable to actuate said vertically movable member, a driving connection between said master cam and the work spindle including alterable change gears for varying the speed ratio therebetween, and means for rotating said spindles.

In testimony whereof, I have hereunto affixed my signature.

ERNEST J. SVENSON.

CERTIFICATE OF CORRECTION.

Patent No. 1,894,719. January 17, 1933.

ERNEST J. SVENSON.

It is hereby certified that error appears in the printed specification of the above numbered patent requiring correction as follows: Page 8, line 37, claim 14, for "cam" read "shaft"; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.

justable connection with said head, means for actuating said cam and including a pair of change gears adapted for connection with the actuating mechanism of the lathe, and a driving connection between said last mentioned means and said work supporting means including a pair of alterable change gears.

27. A cam milling attachment for lathes and other machine tools, comprising, in combination, a frame adapted to be mounted in fixed position on a lathe bed, a head reciprocably mounted on said frame, rotatable work supporting means on said head, a rotatable master cam removably mounted on said frame and connected to said head whereby to move the same, means for rotating said master cam adapted to be operatively connected to the actuating mechanism of the lathe and including a pair of change gears, and a driving connection between said last mentioned means and said work supporting means including a pair of alterable change gears.

28. A cam milling machine comprising, in combination, a bed, a support uprising from said bed, a member vertically movable on said support, a rotatable spindle mounted horizontally on said member, a second spindle rotatably mounted in a horizontal position on said bed, one of said spindles having a cutter mounted thereon so as to lie beneath one end of the other spindle, means on the other spindle for supporting a cam blank above said cutter, a master cam rotatable to actuate said vertically movable member, a driving connection between said master cam and the work spindle including alterable change gears for varying the speed ratio therebetween, and means for rotating said spindles.

In testimony whereof, I have hereunto affixed my signature.
ERNEST J. SVENSON.

CERTIFICATE OF CORRECTION.

Patent No. 1,894,719.                                      January 17, 1933.

ERNEST J. SVENSON.

It is hereby certified that error appears in the printed specification of the above numbered patent requiring correction as follows: Page 8, line 37, claim 14, for "cam" read "shaft"; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.

CERTIFICATE OF CORRECTION.

Patent No. 1,894,719. January 17, 1933.

ERNEST J. SVENSON.

It is hereby certified that error appears in the printed specification of the above numbered patent requiring correction as follows: Page 8, line 37, claim 14, for "cam" read "shaft"; and that the said Letters Patent should be read with this correction therein that the same may conform to the record of the case in the Patent Office.

Signed and sealed this 28th day of February, A. D. 1933.

M. J. Moore,
Acting Commissioner of Patents.

(Seal)